(12) United States Patent
Stahlhut et al.

(10) Patent No.: US 8,672,397 B2
(45) Date of Patent: Mar. 18, 2014

(54) ROOF STRUCTURE OF A MOTOR VEHICLE AND ROOF MODULE

(75) Inventors: Richard Stahlhut, Offenbach (DE); Axel Boywitt, Weiterstadt (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/474,959

(22) Filed: May 18, 2012

(65) Prior Publication Data
US 2012/0292950 A1 Nov. 22, 2012

(30) Foreign Application Priority Data
May 20, 2011 (DE) .......................... 10 2011 102 158

(51) Int. Cl.
*B62D 25/06* (2006.01)
*B60R 9/08* (2006.01)

(52) U.S. Cl.
USPC .......................................... 296/215; 224/329

(58) Field of Classification Search
USPC ........... 296/210, 211, 215; 224/322–326, 329
See application file for complete search history.

(56) References Cited

U.S. PATENT DOCUMENTS

| | | | | |
|---|---|---|---|---|
| 2,157,366 | A | * | 5/1939 | Vigroux .................... 296/146.15 |
| 6,793,277 | B2 | | 9/2004 | Chon et al. |
| 6,848,739 | B2 | * | 2/2005 | Stallfort et al. ............... 296/215 |
| 2006/0131934 | A1 | | 6/2006 | Uchida et al. |

FOREIGN PATENT DOCUMENTS

| | | | |
|---|---|---|---|
| DE | 19947776 | A1 | 4/2001 |
| DE | 10028320 | A1 | 12/2001 |
| DE | 10158399 | A1 | 11/2002 |
| DE | 10210615 | * | 10/2003 |
| DE | 60014259 | T2 | 2/2006 |
| DE | 60208002 | T2 | 8/2006 |
| DE | 102005029161 | A1 | 12/2006 |
| EP | 1669245 | A1 | 6/2006 |
| JP | 2000-108657 | * | 4/2000 |
| WO | 2012095576 | A1 | 7/2012 |

OTHER PUBLICATIONS

German Patent Office, German Search Report for Application No. DE102011102158.6, dated Feb. 29, 2012.
UK IPO, British Search Report for Application No. 1208258.2, dated Aug. 22, 2012.

* cited by examiner

*Primary Examiner* — Dennis Pedder
(74) *Attorney, Agent, or Firm* — Ingrassia Fisher & Lorenz, P.C.

(57) ABSTRACT

The invention relates to a roof structure of a motor vehicle, in which a roof channel, which extends in the vehicle longitudinal direction, having a fastening flange is formed on both vehicle sides by at least one vehicle body component. A roof module is fastened on the two fastening flanges, which has a planar section, implemented at least sectionally in the form of a glass roof, for bridging a roof opening formed between the roof channels, at least one pair of installation bases for installing a roof rail being arranged between the fastening flanges and the planar section of the roof module. The planar section has a plurality of module openings, which are assigned to the installation bases and are each enclosed by a plastic extrusion coating, for an installation of the roof rail.

10 Claims, 5 Drawing Sheets

ROOF STRUCTURE OF A MOTOR VEHICLE AND ROOF MODULE

CROSS-REFERENCE TO RELATED APPLICATION

This application claims priority to German Patent Application No. 10 2011 102 158.6, filed May 20, 2011, which is incorporated herein by reference in its entirety.

TECHNICAL FIELD

The technical field generally relates to motor vehicle technology and more particularly relates to a roof module and a roof structure of a motor vehicle equipped with such a roof module.

BACKGROUND

Modern motor vehicles are typically provided with a self-supporting vehicle body, which allows a weight and cost reduction in comparison to a vehicle body constructed on a frame. In the self-supporting vehicle body, the components in their entirety absorb the introduced forces, the stiffness of the vehicle body being achieved by hollow sheet-metal cross-sections and a compact sheet-metal outer skin.

In the unfinished vehicle body, a roof opening for the vehicle roof is typically bounded by a roof frame. Module components ("roof module") are frequently installed as vehicle roofs on the assembly line. The roof frame typically has lateral frame parts having horizontal fastening flanges for fastening on the roof module for this purpose.

In order to transport bicycles, sporting equipment such as skis and snowboards, and movable loads in general, the possibility of installing roof cross rails is desired by many vehicle owners. In a construction that is common in mass production, installation bases, on which the roof cross rails are installable, are attached for this purpose to the fastening flanges.

In contrast, at least one object herein includes refining typical roof structures of motor vehicles. In addition, other objects, desirable features and characteristics will become apparent from the subsequent summary and detailed description, and the appended claims, taken in conjunction with the accompanying drawings and this background.

SUMMARY

Direction and location specifications made hereafter such as "longitudinal", "transverse", "top", "bottom", "front", "rear", "horizontal", and "vertical" relate to a horizontally standing motor vehicle and its (forward) travel direction.

A roof structure of a motor vehicle is described. As defined herein, a "roof structure" is considered to be the top part of the motor vehicle by which the vehicle interior, for example, the passenger compartment in passenger automobiles, is delimited on top.

The roof structure according to an embodiment comprises on each vehicle side at least one vehicle body component by which a lateral roof channel extending in the vehicle longitudinal direction is formed. The roof channel is typically formed by a plurality of vehicle body components in each case on both vehicle sides. The vehicle body components can consist of sheet metal, a light metal material such as aluminum, magnesium, or an alloy thereof, or a non-metallic material, for example, fiber-reinforced plastic. A roof-side vehicle body opening (roof opening), which can be at least sectionally closed by a roof module, is formed by the opposing vehicle body components in the vehicle transverse direction. For this purpose, the roof module is fastened onto two fastening flanges, which extend in the vehicle longitudinal direction and are horizontal in particular, and which are each formed by the vehicle body component forming a roof channel. The roof module has, for bridging the roof opening, a flatly implemented section (planar section), which is implemented at least sectionally, preferably over the entire area, in the form of a glass roof.

Furthermore, in the roof structure according to an embodiment, at least one pair of installation bases is arranged on the two fastening flanges for installing a roof (cross) rail between the fastening flanges and the planar section of the roof module. Typically, a front pair of installation bases and a rear pair of installation bases are provided for the respective installation of a roof rail.

In one embodiment, the roof module extends outward at least up to the installation bases, but generally extends outward beyond the installation bases, so that the installation bases are each located between one of the two fastening flanges and the planar section of the roof module. The planar section of the roof module has a plurality of module openings assigned to the installation bases, which are implemented and arranged so that they allow access to the installation bases from above for the installation/removal of the roof rail onto/from the installation bases. In addition, the module openings in the planar section of the roof module are each completely extrusion coated using a plastic. The planar section can therefore be implemented as a glass roof over the entire area in particular (with the exception of the module openings and their plastic extrusion coatings).

The roof structure according to an embodiment therefore allows the planar section of the roof module, which is implemented at least sectionally, preferably over the entire area, as a glass roof, to extend out beyond the installation bases and to reach up to outer delimitations of the two lateral roof channels having a very small joint width of a few millimeters. The roof structure of the motor vehicle can therefore be designed in a particularly aesthetically appealing manner, a particularly good view of vehicle occupants to the outside or a very "open" room feeling and a very high level of incident light being able to be achieved. A separate strip for covering the installation bases and their fastening means can be dispensed with, whereby time and costs can be saved, in particular for manufacturing and storing such strips. Through the extrusion coating of the module openings using plastic, an implementation of the module openings in the planar section which is particularly technically simple can be achieved, which allows reliable and secure installation of roof (cross) rails.

In the roof structure according to an embodiment, the roof module is respectively fastened on both vehicle sides on the fastening flange by a fastening means, for example, an adhesive bead extending essentially in the vehicle longitudinal direction. The fastening means has, on each vehicle side in a zone not containing an installation base (designated hereafter as the "first" zone), a greater distance from a central vehicle longitudinal vertical plane than in a zone containing the installation base (designated hereafter as the "second" zone). This means that the fastening means is located farther outward in the first zone than in the second zone. This allows in particular for the fastening flange, which extends on both vehicle sides in the vehicle longitudinal direction in each case, for fastening the roof module in the installation-base-free first zone, to have a lesser width measured perpendicularly to its extension than in the second zone containing an installation base. Without impairing the stability and reliability of the fastening of the roof module, material and costs can be saved in the vehicle manufacturing by this measure. In addition, the vehicle weight can be decreased, whereby costs for operating the motor vehicle can be saved by reduced fuel consumption.

In a further embodiment of the roof structure, the module openings each have a reclosable closure element for closing the installation opening. The closure element can be, for example, a hinged lid or sliding lid. Entry of dirt and water into the module openings can be prevented by the closure elements, and the external appearance of the roof structure can additionally be improved.

Furthermore, a roof module for a roof structure of a motor vehicle is provided herein. The roof structure is provided on each vehicle side with a roof channel, extending in the vehicle longitudinal direction, having a fastening flange for fastening the roof module. The roof module has a planar section, which is implemented at least sectionally, preferably over the entire area, in the form of a glass roof, for bridging a roof opening formed between the roof channels, the planar section being provided with a plurality of module openings, which are each assigned to an installation base implemented in the area of the roof channels for installing a roof rail. The module openings are each enclosed by a plastic extrusion coating. In one embodiment, the module openings each have a reclosable closure element.

In addition, a motor vehicle which has a roof structure as described above is contemplated herein.

The various embodiments can be implemented individually or in arbitrary combinations. In particular, the above-mentioned features and the features to be explained hereafter are usable not only in the specified combinations, but rather also in other combinations or alone.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Figure 1A:
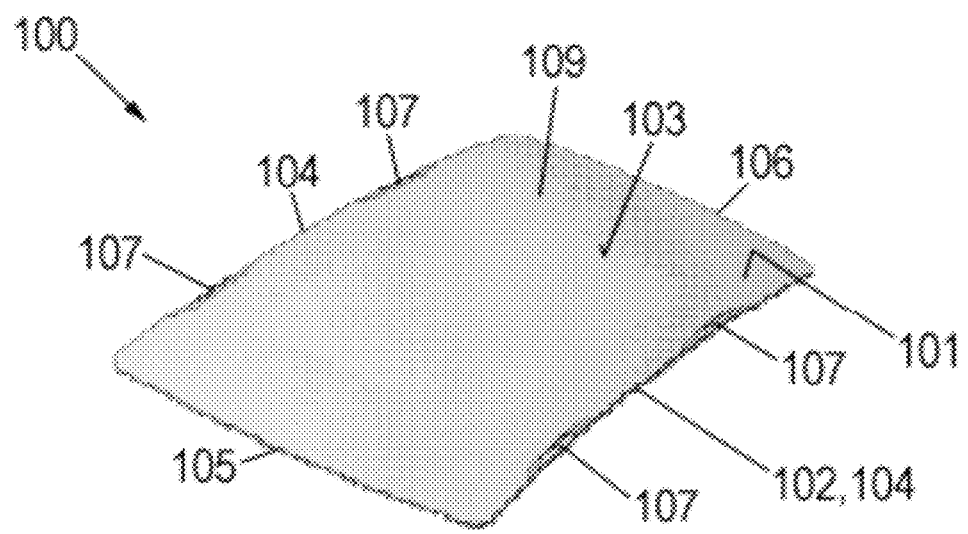
FIGS. 1A-1B show a perspective view from above of an exemplary embodiment of the roof module (FIG. 1A) and a top view of an enlarged detail (FIG. 1B)
Figure 1B:
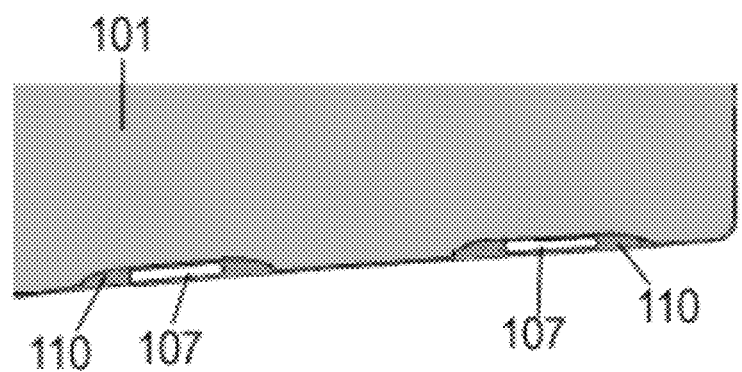

FIGS. 1A and 1B will be considered first, in which an exemplary embodiment of the roof module 100 for installation in a roof structure 1 of a motor vehicle is shown from above on the basis of a perspective view.

Accordingly, the roof module 100 comprises a planar section 101, which is bounded by a module edge 102 having the two side edges 104 and a front-side and a rear-side edge 105, 106. In the installed state, the surface section 101 delimits a vehicle interior or passenger compartment from the outer environment. An outer surface 103 of the planar section 101 forms a part of the outer skin of the motor vehicle. An inner surface (not recognizable on the basis of the illustration) can, depending on the design of the roof module, be part of the vehicle roof lining or can be concealed by a roof-side inner panel. The planar section 101 is implemented here, for example, over the entire area as a glass pane or glass roof 109. Adjoining the two side edges 104, the planar section 101 has two module openings 107 arranged offset to one another in the vehicle longitudinal direction in each case, which are implemented here as breakthroughs. The module openings 107 are each completely extrusion coated using a plastic by an extrusion coating 110, so that the module openings 107 are finally bounded by plastic. In the roof module 100, each two module openings 107 are arranged opposite to one another in the vehicle transverse direction, the module openings 107 each being assigned to an installation base 6 shown in FIGS. 2 and 3. The expression "over the entire area" refers here to the fact that the planar section 101 consists completely of glass with the exception of the module openings 107 and the plastic extrusion coatings 110.

Figure 2:
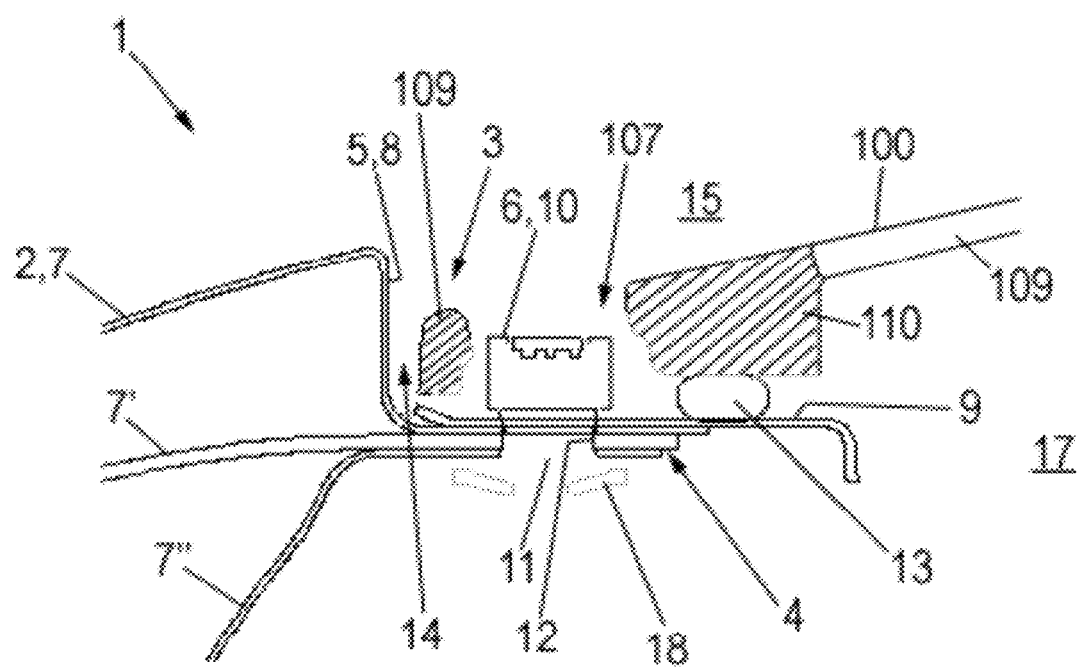
FIG. 2 shows a sectional view of an exemplary embodiment of the roof structure having the roof module of FIGS. 1A and 1B.
Figure 3:
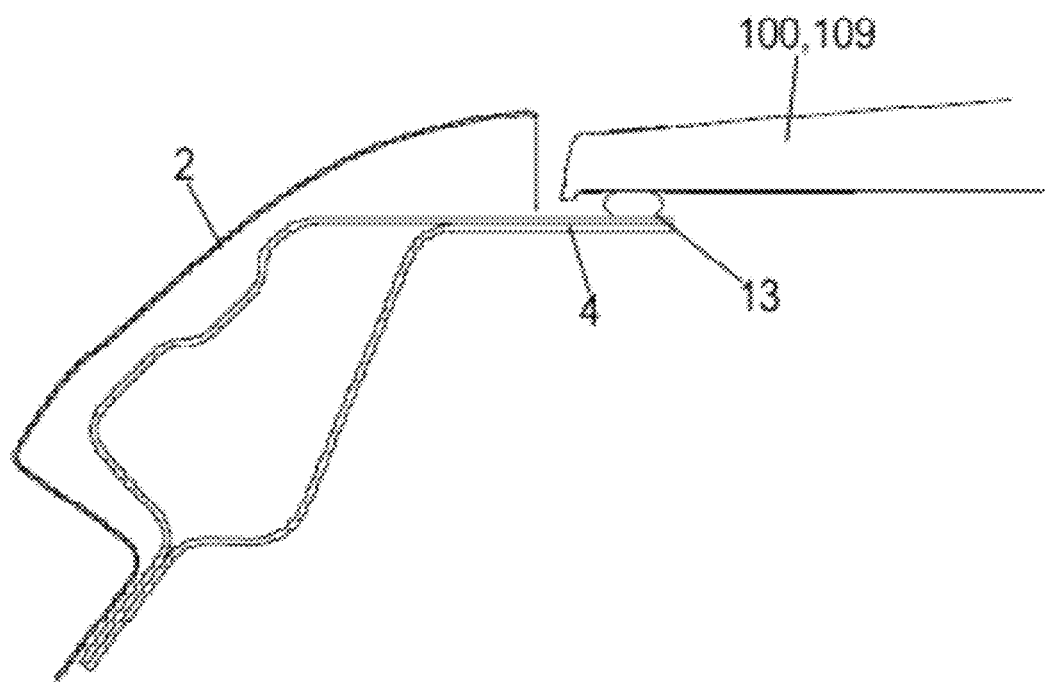
FIG. 3 shows a further sectional view of the roof structure of FIG. 2.

In FIGS. 2 and 3, an exemplary embodiment of the roof structure 1 is explained on the basis of sections in the vehicle transverse direction. FIG. 2 shows a section at the height of an installation base 6 and FIG. 3 shows a section outside an installation base 6. The roof structure 1 is only shown on one vehicle side in the area of a roof channel 3 in each of the figures, it being obvious that the roof structure 1 is implemented symmetrically on the other vehicle side.

Accordingly, the roof structure 1 comprises on each vehicle side a lateral spar 2 extending in the vehicle longitudinal direction, which is assembled here, for example, from three vehicle body plates, namely an outer vehicle body plate 7, a middle vehicle body plate 7', and an inner vehicle body plate 7". The outer vehicle body plate 7 is shaped at least approximately right-angled in section and comprises a first or vertical plate section 8 and a second or horizontal plate section 9, which jointly form a roof channel 3 extending in the vehicle longitudinal direction. A side wall 5 of the roof channel 3 is formed by the vertical plate section 8.

The three vehicle body plates 7, 7', 7" are fixedly connected to one another in the area of the horizontal plate section 9. A horizontal fastening flange 4 for fastening the roof module 100 is formed by the outer vehicle body plate 7, in particular in the area of the three vehicle body plates 7, 7', 7" fixedly connected to one another. The fastening flange 4 extends in the vehicle longitudinal direction with its width measured in the vehicle transverse direction. A roof opening 17 formed by the fastening flange is 4 is bridged or closed by the planar section 101 of the roof module 100, which is implemented as a glass roof 109, the planar section 101 being fastened on the two fastening flanges 4.

In each of the two roof channels 3, two installation bases 6 arranged offset in the vehicle longitudinal direction are fastened on the fastening flange 4, of which one is shown in section in FIG. 2. The installation base 6 comprises, for example, a cylindrical or rectangular base body 10 having a molded-on threaded bolt 11, which penetrates a breakthrough 12 of the fastening flange 4 and is screwed together with a counter nut 18 to fasten the installation base 6 on the fastening flange 4. The installation bases 6 each protrude upward from the fastening flange 4. The roof structure 1 has, for example, a front and rear pair of installation bases 6 opposite to one another in the vehicle transverse direction here. The installation bases 6 of the same pair are used for installing a roof (cross) rail (not shown).

The planar section 101 of the roof module 100 implemented as a glass roof 109 extends in the vehicle transverse direction up to beyond the installation bases 6, the side edge 104 in the roof channel 3 being arranged farther outward, i.e., having a greater distance from a central vehicle longitudinal vertical plane, than the installation bases 6. The side edge 104 of the roof module 100 directly adjoins the vertical plate section 8 or the side wall 5 of the vehicle body plate 7 on each vehicle side, a joint 14 having a small joint width of, for example, approximately 4 mm (tolerance±2 mm) remaining. Access to the installation bases 6 is made possible through the module openings 107 assigned to the installation bases 6. In the installed roof module 100, the module openings 107 are located outside the installation bases 6 for this purpose. Installation/removal of the roof (cross) rails is therefore possible in a simple manner.

In the roof structure 1, in an exemplary embodiment, an adhesive bead 13 extending in the vehicle longitudinal direction is used on each vehicle side for fastening the planar section 101 of the roof module 100 onto the lateral fastening flange 4, although any other fastening means suitable for this purpose can be used similarly. As noted from FIG. 2, the adhesive bead 13 extends in the area of the installation bases 6 on the vehicle inner side of the installation bases 6. As shown in FIG. 3, a section through the roof structure 1 above an installation base 6, the adhesive bead 13 extends, outside the installation base 6, farther on the outside or at a greater distance from the central vehicle longitudinal vertical plane, so that the fastening flange 4 can have a lesser width (measured in the vehicle transverse direction) there. Material and vehicle weight can thus be saved.

Figure 4:
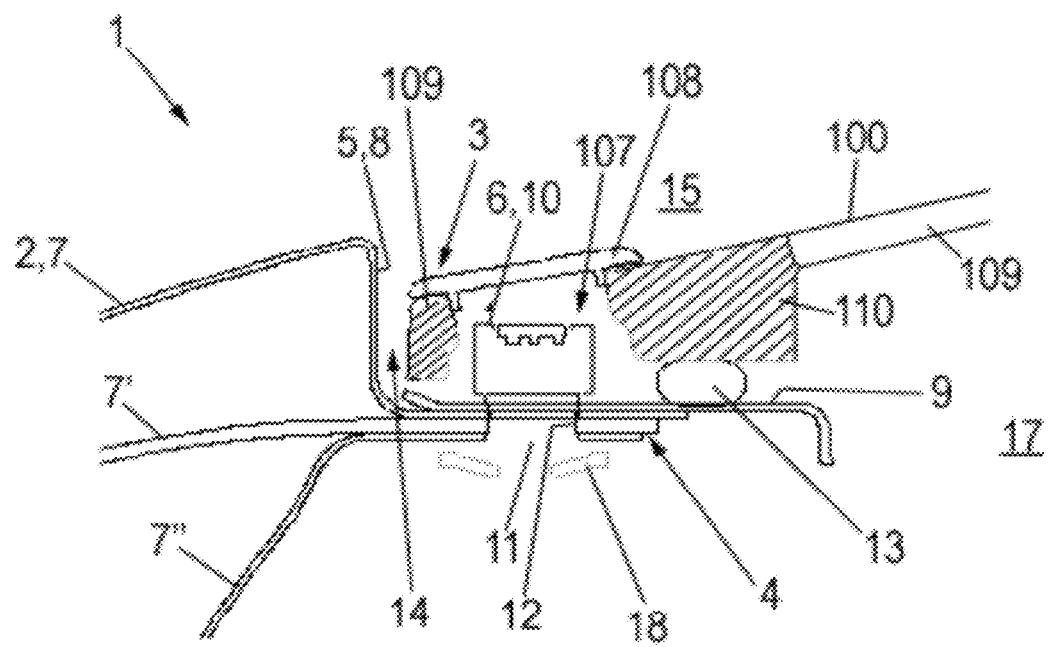
FIG. 4 shows a sectional view of a variant of the roof structure of FIG. 2 and FIG. 3.

FIG. 4 shows a variant of the roof structure of FIG. 3, which only differs in that the module openings 107 are each closed using a reversibly removable cover 108. The entry of dirt and moisture at the module openings 107 is prevented in this manner. By removing the cover 108, access to the installation bases 6 can be provided. Instead of a cover 108, another closure means suitable for this purpose could similarly be provided, for example, a slide.

Figure 5:
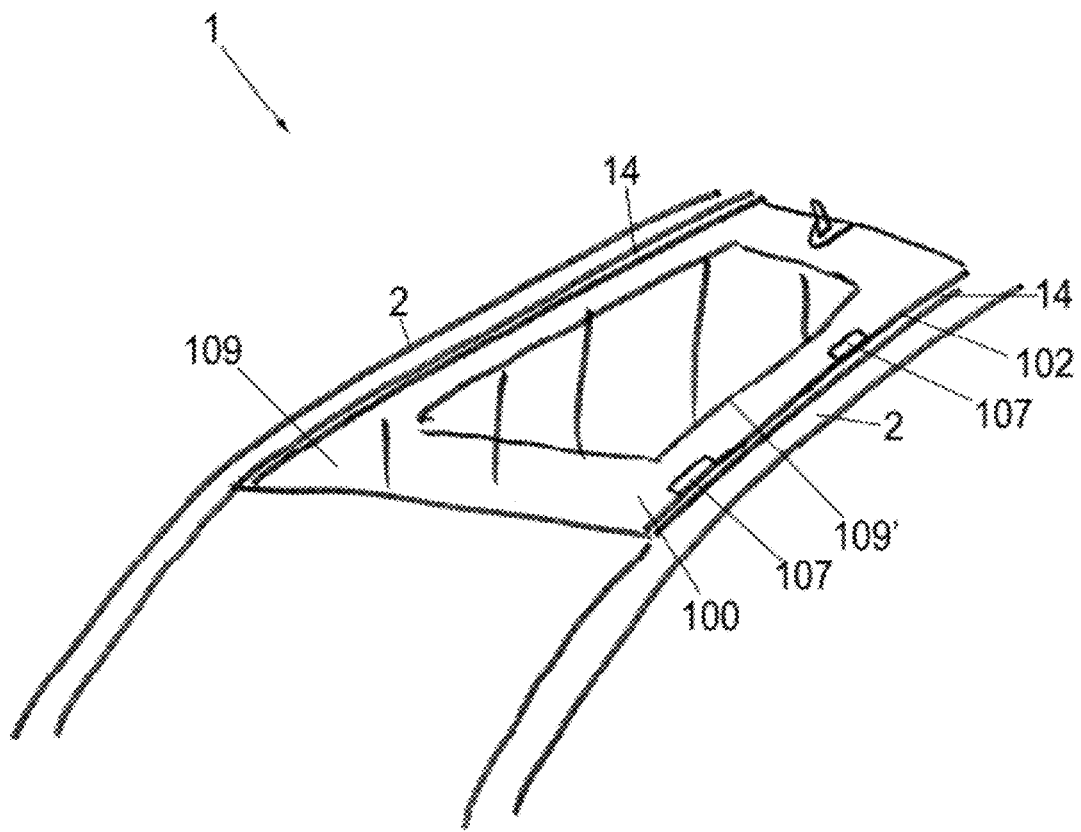
FIG. 5 shows a perspective view from above to illustrate further exemplary embodiments of the roof structure.

FIG. 5 shows a perspective view of the roof structure 1 of FIGS. 2 to 4, the planar section 101 of the roof module 100 being implemented as a glass roof or comprising such a glass roof. Various variants are combined in one illustration in FIG. 5. In a first variant, which corresponds to FIGS. 1 to 4, the planar section 101 is implemented over the entire area as a glass roof 109, so that the glass extends up to the module edge 102 (with the exception of the module openings 107). In a second variant, only an inner part of the planar section 101 is implemented as a glass roof 109'. The module openings 107 are only shown on one vehicle side in FIG. 5.

The roof structure 1 therefore provides for the first time that the planar section 101 of the roof module 100 can extend beyond the installation bases 6 so that to improve the external appearance, for a better view outward, and for increased incident light, a relatively small joint width can be implemented between the side edges 104 and the outer delimitation of the roof channel 3. Material and costs can be saved by the possibility of reducing the width of the fastening flange outside the installation bases 6. In addition, the vehicle weight can be reduced.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A roof structure of a motor vehicle, the roof structure comprising:
    a first roof channel and a second roof channel, the first roof channel disposed on a first side of the motor vehicle and the second roof channel disposed on the second side of the motor vehicle, each of the first and second roof channels extending in a vehicle longitudinal direction;
    a first fastening flange and a second fastening flange, the first fastening flange disposed in the first roof channel and the second fastening flange disposed in the second roof channel;
    a roof module fastened to the motor vehicle by the first and second fastening flanges, wherein the roof module comprises:
        a planar section implemented at least sectionally in a form of a glass roof for bridging a roof opening of the motor vehicle formed between the first and second roof channels; and
        a first installation base and a second installation base for installing a roof rail, the first installation base disposed on the first side of the motor vehicle and the second installation base disposed on the second side of the motor vehicle, wherein the first installation base is arranged between the first fastening flange and the planar section and the second installation base is arranged between the second fastening flange and the planar section;
        wherein the planar section has a plurality of module openings that are enclosed by a plastic extrusion coating, wherein each of the plurality of module openings is located outside each of the first and second installation bases for installation of a roof rail,
    wherein the planar section is implemented over the entire roof opening as the glass roof, and wherein at least of portion of the glass roof extends beyond the first and second installation bases in a vehicle transverse direction upon installation.

2. The roof structure according to claim 1, wherein each of the first and second fastening flanges has a smaller width, measured perpendicularly to its extension, in a first zone free of an installation base than in a second zone containing an installation base.

3. The roof structure according to claim 1, wherein the roof module is fastened on one of the first and second fastening flanges by an adhesive bead extending in the vehicle longitudinal direction.

4. The roof structure according to claim 1, wherein each of the plurality of module openings have a reclosable closure element.

5. A roof module for a roof structure of a motor vehicle, the roof module comprising:
    a planar section implemented at least sectionally in a form of a glass roof for bridging a roof opening formed between two lateral roof channels of the roof structure, wherein the planar section has a plurality of module openings, which are each enclosed by a plastic extrusion coating, and to each of which an installation base, which is arranged in an area of the two lateral roof channels for installing a roof rail, is assigned, wherein the planar section is implemented over the entire roof opening as the glass roof, and wherein at least of portion of the glass roof extends beyond the installation bases in a vehicle transverse direction upon installation.

6. The roof module according to claim 5, wherein each of the plurality of module openings have a reclosable closure element.

7. A motor vehicle comprising:
a vehicle body; and
a roof structure coupled to the vehicle body, the roof structure comprising:
a first roof channel and a second roof channel, the first roof channel disposed on a first side of the motor vehicle and the second roof channel disposed on the second side of the motor vehicle, each of the first and second roof channels extending in a vehicle longitudinal direction;
a first fastening flange and a second fastening flange, the first fastening flange disposed in the first roof channel and the second fastening flange disposed in the second roof channel;
a roof module fastened to the motor vehicle by the first and second fastening flanges, wherein the roof module comprises:
a planar section implemented at least sectionally in a form of a glass roof for bridging a roof opening of the motor vehicle formed between the first and second roof channels; and
a first installation base and a second installation base for installing a roof rail, the first installation base disposed on the first side of the motor vehicle and the second installation base disposed on the second side of the motor vehicle, wherein the first installation base is arranged between the first fastening flange and the planar section and the second installation base is arranged between the second fastening flange and the planar section;
wherein the planar section has a plurality of module openings that are enclosed by a plastic extrusion coating, wherein each of the plurality of module openings is located outside each of the first and second installation bases for installation of the roof rail,
wherein the planar section is implemented over the entire roof opening as the glass roof, and wherein at least of portion of the glass roof extends beyond the first and second installation bases in a vehicle transverse direction upon installation.

8. The motor vehicle according to claim 7, wherein each of the first and second fastening flanges has a smaller width, measured perpendicularly to its extension, in a first zone free of an installation base than in a second zone containing an installation base.

9. The motor vehicle according to claim 7, wherein the roof module is fastened on one of the first and second fastening flanges by an adhesive bead extending in the vehicle longitudinal direction.

10. The motor vehicle according to claim 7, wherein each of the plurality of module openings have a reclosable closure element.

* * * * *